July 7, 1953 D. L. MILLER 2,644,338
ENGINE STARTER GEARING
Filed Oct. 31, 1951
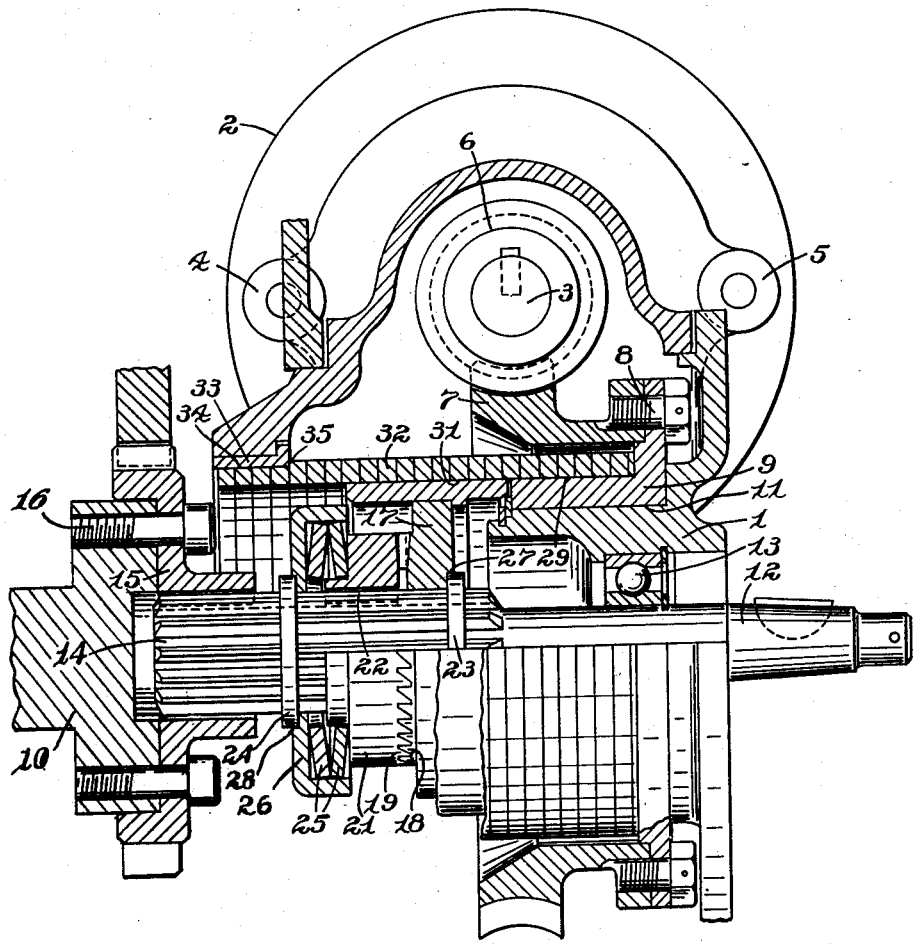
WITNESS:
INVENTOR.
Donald L. Miller
BY
ATTORNEY Patented July 7, 1953

2,644,338

UNITED STATES PATENT OFFICE 2,644,338

ENGINE STARTER GEARING

Donald L. Miller, Horseheads, N. Y., assignor to Bendix Aviation Corporation, a corporation of Delaware Application October 31, 1951, Serial No. 254,123

3 Claims. (Cl. 74—7)

The present invention relates to engine starter gearing and more particularly to a reduction gear connection from a starting motor to a shaft gear connection from a starting motor to a shaft which is directly coupled to the crank shaft of the engine to be started.

It is an object of the present invention to provide a novel engine starter gear unit which is of high torque capacity for its size and weight, in which the parts are at all times in position and condition to transmit cranking torque, and which incorporates means for dissipating and protecting the gearing from the effects of shock loads or peak torques.

Further objects and advantages will be apparent from the following description taken in connection with the accompanying drawing in which the figure represents a substantially midsectional view of a preferred embodiment of the invention.

In the drawing there is illustrated a casing 1 on which a starting motor 2 having a power shaft 3 is fixedly mounted by any suitable means as indicated at 4 and 5. Power shaft 3 has fixed thereon a driving gear in the form of a worm 6 which meshes with and drives a worm gear 7 fixedly mounted as indicated at 8 on a driving coupling member 9 which is journaled on a bearing 11 formed in the casing 1.

A driven shaft 12 is journaled in the casing by means of a bearing 13 and is provided with a splined section 14 by which it is coupled to a driven member 15 fixedly mounted on the crank shaft 10 of the engine to be started as indicated at 16 so as to form effectively a part of said crank shaft. A driven coupling member 17 is rotatably mounted on the driven shaft 12, and is provided on one side with inclined teeth 18 which cooperate with similar teeth 19 on a transmission member 21 which is splined as shown at 22 on the driven shaft.

A split stop ring 23 is mounted in a circumferential groove in the driven shaft so as to form an abutment for the driven coupling member 17 and a similar stop ring 24 is also mounted on said shaft spaced longitudinally from the transmission member 21. In the space between the transmission member and the stop ring 24 is located a compression spring comprising elastic discs 25 which are retained in position by a cup member 26 on the shaft seated against the stop ring 24. The stop rings 23 and 24 preferably enter recesses or counterbores 27 and 28 in the driven coupling member and retainer cup respectively, the stop rings being so located on the driven shaft as to maintain the spring 25 suitably compressed to cause the inclined teeth 18, 19 to transmit a predetermined torque before being permitted to slide over each other.

The driving coupling member 9 is provided with a cylindrical surface 29, and the driven coupling member 17 has a similar surface 31 in alinement therewith. A coiled clutch spring 32 is mounted on the cylindrical surfaces 29, 31 and is wound in such a direction that the transmission of cranking torque from the driving coupling member 9 through the clutch spring causes it to wrap down and grip the cylindrical surfaces. The free end of the spring 32 is journaled in a bearing 33 in the casing, the portion of the spring which is located within the bearing 33 being preferably ground down as shown at 34 to a slightly smaller diameter in order to form a shoulder 35 which retains the spring in the casing.

In operation, when it is desired to start the engine, energization of the motor 2 from a suitable source of electrical energy causes the worm 6 to rotate the worm gear 7 and driving coupling member 9, which rotation is transmitted through the clutch spring 32 to the driven coupling member 17. The inclined surfaces of the teeth 18 on the driven coupling member engage the similar surfaces 19 of the transmission member 21 and thereby cause rotation of the driven shaft 12 and engine member 15. Should the torque load on the transmission exceed a predetermined maximum, by reason of backfiring of the engine or for any other reason, the inclined teeth 18, 19 wedge apart, compressing the spring 25 until the teeth are permitted to ratchet over each other. As soon as the excessive load condition is removed, transmission of torque through the drive in the usual manner is resumed.

When the engine starts, acceleration of the transmission member 21 and driven coupling member 17 causes the spring 32 to unwrap and allow the driven coupling member with its associated parts to overrun the driving coupling member 9 freely.

It will be noted that at all times that the clutch spring 32 is rotating, the direction of rotation is such as to cause the reduced end 34 of the spring to contract and thereby rotate freely within the bearing 33.

Although but one embodiment of the invention has been shown and described in detail, it will be understood that various changes may be made in the precise design and arrangement of the parts without departing from the spirit of the invention.

I claim:

1. Reduction gearing for engine starters comprising a casing, a power shaft rotatably mounted therein, a driving gear fixed on the power shaft, a driving coupling member journaled in the casing having a smooth cylindrical surface, a driven gear fixedly mounted on said coupling member and meshing with the driving gear, a driven shaft journaled in the casing coupled to a member of the engine to be started, a driven coupling member journaled on the driven shaft having inclined teeth on one side, and having a cylindrical surface in alinement with the cylindrical surface of the driving coupling member, a coiled spring bearing on said cylindrical surfaces and so wound as to wrap down and grip said surfaces to transmit cranking torque from the driving to the driven coupling member, a transmission member splined on the driven shaft having inclined teeth cooperating with the inclined teeth of the driven coupling member, and yielding means resisting relative slippage of said inclined teeth.

2. Starter gearing as set forth in claim 1 in which the driven shaft is provided with a splined portion on which the driven coupling member is journaled, and the transmission member is slidably but non-rotatably mounted; a stop ring forming an abutment for the driven coupling member on the driven shaft, a second stop ring on said shaft spaced from the transmission member, and means including a compression spring in said space for pressing the transmission member against the driven coupling member.

3. Starter gearing as set forth in claim 2 including further a retainer cup on the driven shaft surrounding and supporting the compression spring, said stop rings being split, and said retainer cup and driven coupling member having annular recesses formed to receive the stop rings and confine them on the driven shaft.

DONALD L. MILLER.

No references cited.